(12) United States Patent
Straub et al.

(10) Patent No.: US 6,866,575 B2
(45) Date of Patent: Mar. 15, 2005

(54) METHOD FOR REGULATING A HEATING AND/OR AIR-CONDITIONING SYSTEM

(75) Inventors: Wolfgang Straub, Deggingen (DE); Andrea Theiss, Gaeufelden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/374,752

(22) Filed: Feb. 27, 2003

(65) Prior Publication Data

US 2003/0226902 A1 Dec. 11, 2003

(30) Foreign Application Priority Data

Feb. 28, 2002 (DE) .......................................... 102 09 004

(51) Int. Cl.[7] .................................................. B60S 1/54
(52) U.S. Cl. ...................................... 454/121; 454/159
(58) Field of Search ...................... 237/12.3 B, 12.3 R; 454/121, 159

(56) References Cited

U.S. PATENT DOCUMENTS 4,232,211 A * 11/1980 Hill ............................ 219/202
4,459,466 A * 7/1984 Nakagawa et al. ......... 392/307
5,279,459 A * 1/1994 Single, II .................... 237/2 A
6,138,749 A * 10/2000 Kawai et al. ................ 165/204

FOREIGN PATENT DOCUMENTS

DE 19751370 12/1998

* cited by examiner

*Primary Examiner*—Derek S. Boles
(74) *Attorney, Agent, or Firm*—Crowell & Moring LLP

(57) ABSTRACT

A method regulates a heating and/or air-conditioning system, with a control apparatus which activates the individual air-conditioning components according to control and regulating programs. The vehicle interior has individual air-conditioning zones which can be regulated individually in terms of their air-conditioning capacity by the general air-conditioning regulation. An air-conditioning deficit of each individual air-conditioning zone can be detected, and the general air-conditioning regulation of the heating and/or air-conditioning system can set this air-conditioning zone independently. One or more central or decentralized additional-heating and/or cooling elements are included.

13 Claims, 2 Drawing Sheets

METHOD FOR REGULATING A HEATING AND/OR AIR-CONDITIONING SYSTEM

BACKGROUND OF THE INVENTION

This application claims the priority of German Application 102 09 004.1 filed Feb. 28, 2002, the disclosure of which is expressly incorporated by reference herein.

The present invention relates to a method for regulating a heating and/or air-conditioning system, and more particularly to a method which uses a control apparatus which activates the individual air-conditioning components according to control and regulating programs contained in it, the vehicle interior having individual air-conditioning zones which can be regulated individually in terms of their air-conditioning capacity by the general air-conditioning regulation.

DE 19751370 C1 discloses a heating, ventilation and/or air-conditioning system for motor vehicles, with an interior-temperature regulating device which changes over to a special comfort operating mode when a heating-capacity deficiency occurs. The system detects a heating-capacity deficiency which is present when predetermined desired values of the outlet-air temperature cannot be reached by the available heating capacity. The regulating device is switched over to a comfort operating mode when a heating-capacity deficiency is present and switched back into a standard operating mode when there is no heating-capacity deficiency. In the comfort operating mode, the conveying capacity of the blower is set by an experimentally determined vehicle-specific characteristic curve. If apparatus for detecting a heating-capacity deficiency in the system are connected electrically to a control unit for controlling at least one air-mixing flap and/or for controlling a heat-exchanger valve, a heating-capacity deficiency in the system is detected, for example, when the air-mixing flap and/or the valve are in a maximum position.

In this type of heating and/or air-conditioning system, one disadvantage is that the individual air outlets cannot be regulated completely independently of one another in terms of their heating capacity. It is only possible to detect a general heating-capacity deficiency and then switch over to the comfort operating mode. It is not possible, however, to activate individual air outlets specifically as a function of their air-conditioning deficit and specifically counteract cooling effects also due, for example, to cold radiating through the windows, in particular the windscreen.

SUMMARY OF THE INVENTION

An object of the invention is, therefore, to optimize the air-conditioning and specifically compensate air-conditioning deficits in the vehicle.

The foregoing object has been achieved, according to the present invention, by providing that an air-conditioning deficit of each individual air-conditioning zone is detected, and the general air-conditioning regulation of the heating and/or air conditioning system sets this air-conditioning zone independently, with one or more central additional-heating and/or cooling elements being included.

An essential advantage of these embodiments is that the vehicle interior is cooled sharply on cold days precisely due to the large surfaces of the windscreen. This cooling becomes noticeable particularly on the insides of the screen. The side windows sharply cool the interior of the driver's seat, so that the upper arm and thigh which are directed towards the window are sharply cooled. This is extremely unpleasant for the occupant and no longer accords with the comfort claim of top-class vehicles. It is therefore recognized to be advantageous if individual zones of the interior can be air-conditioned individually, thus, for example, a cooling effect of the windows can be counteracted directly at this point. An air-conditioning deficit is detected in the respective zone, and the control apparatus regulates the individual air-conditioning components, such as, for example, additional-heating elements or cooling elements in the air stream or on surfaces, such that this air-conditioning zone is optimally air-conditioned. Then, when a heating-capacity deficiency is detected in this zone, an additional heater which is arranged between the fan and the air outlet is switched on or set higher by the control apparatus of the general air-conditioning regulation, so that this zone is optimally heated. The incorporation of these functions into the general air-conditioning regulation has the advantage that, in the air-conditioning of one air-conditioning zone, the changes for the other zones are also taken into account, so that a thermally well-controlled climate is always established in the vehicle interior.

Other objects, advantages and novel features of the present invention will become apparent from the following detailed description of the invention when considered in conjunction with the accompanying drawings.

DETAILED DESCRIPTION OF THE DRAWINGS

Figure 1:
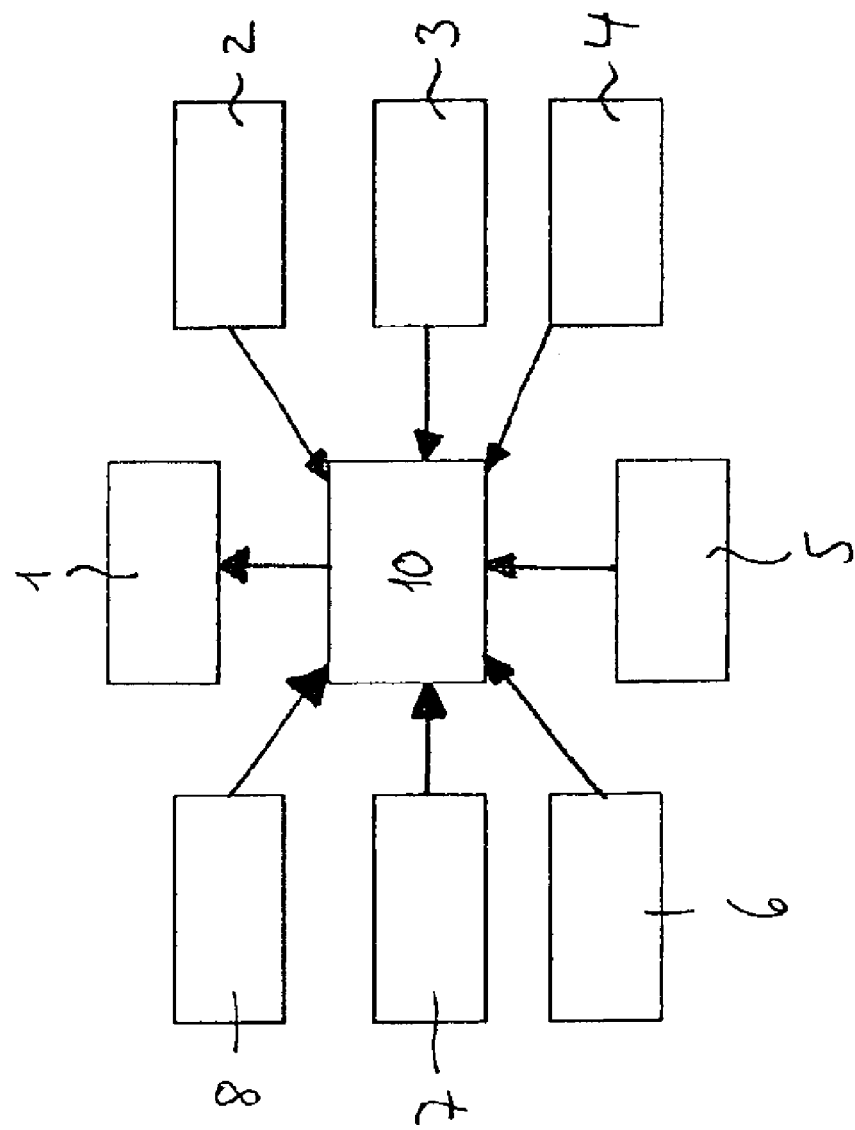
FIG. 1 is a schematic illustration for setting a heating and/or air-conditioning system.

FIG. 1 schematically shows setting a heating and/or air-conditioning system, with a control apparatus 10 for the general air-conditioning regulation of a heating and/or air-conditioning system. The general air-conditioning regulation is integrated in this control apparatus 10. The various sensor values 2 through 8, such as the interior temperature, the outside temperature and the humidity of individual air-conditioning zones, are entered into this control apparatus 10, and then, if an air-conditioning deficit of an air-conditioning zone 1 is detected, this air-conditioning zone 1 is regulated. The vehicle interior has individual air-conditioning zones which can be regulated individually in terms of their air-conditioning capacity by the general air-conditioning regulation. In this case, regulation and/or control takes place so that the other air-conditioning zones of the vehicle do not leave the regulated state. An air-conditioning deficit of each individual zone is detected, and the general air-conditioning regulation of the heating and/or air-conditioning system then regulates this air-conditioning zone independently.

Figure 2:
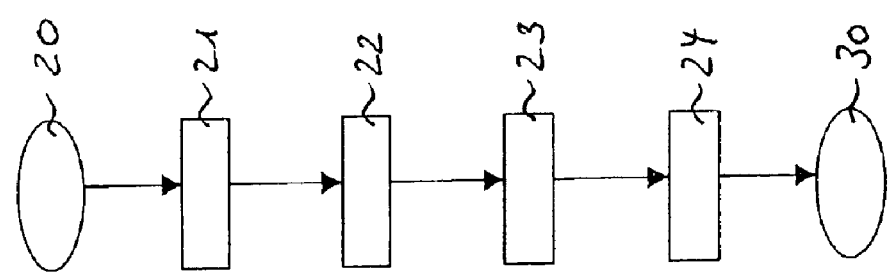
FIG. 2 is a flowchart of a method sequence for regulating an air-conditioning zone in accordance with the present invention.

FIG. 2 shows a method sequence for regulating an air-conditioning zone. After the start 20, the acquisition of the individual sensor values from the sensors arranged in the vehicle, such as the various temperature sensors and the humidity sensors, into the control apparatus takes place at step 21. Control and regulating programs for the general air-conditioning regulation of the vehicle are filed in this control apparatus. Then, at step 22, the states of the individual air-conditioning zones are determined.

At step 23, air-conditioning deficits of the individual predetermined air-conditioning zones are defined and detected in the control apparatus, so that, at step 24, the air-conditioning deficit of this detected air-conditioning zone is counteracted, for example by an additional heater or a cooling element being cut in. This takes place in coordination with the general air-conditioning regulation, so that the other air-conditioning zones do not leave the regulated state. Thereby, in the event of a detected air-conditioning deficit, for example, on the right-hand front-seat passenger side, the additional heater which is arranged on this side in the air duct between the evaporator and the air outflow is switched on or is switched higher.

If only a central additional heater in the central air duct is arranged in the vehicle, as is customary at the present time, this is switched on or switched higher and the heated air is conducted by air guide flaps to the side to be heated. So that the other regulated air-conditioning zones are not excessively heated, the air heated by the additional heater is conducted only onto the side to be regulated. The result is that a heating-capacity deficiency in an air-conditioning zone is detected by the general air-conditioning regulation and this air-conditioning zone is specifically brought into the regulated state, the other air-conditioning zones, for example the air-conditioning of the mid-plane, not being changed.

Decentralized additional-heating elements, cooling elements or additional blowers may be arranged at different points in the vehicle interior and allow the heating or cooling of an air-conditioning zone and are activated by the general air-conditioning regulation. These decentralized elements may be arranged between the fan and the air outlets which are activated by the general air-conditioning regulation when an air-conditioning deficit of this zone is detected.

The regulation of the air-conditioning zone with an air-conditioning deficit can be improved by a plurality of additional heaters arranged at different points in the vehicle, for example in all the air ducts, preferably between the evaporator and the air outflow. Even this switch-on of the additional heaters arranged individually in the vehicle takes place, however, only in the event of an air-conditioning deficit or heating-capacity deficit of the air-conditioning zone assigned to the additional heater or to the cooling element.

An air-conditioning deficit is detected, for example, when the actual temperature measured by the temperature sensor does not correspond to the predetermined desired temperature. By the vehicle being divided specifically into individual air-conditioning zones, the vehicle can be optimally air-conditioned. Thus, cooling through the windows can also be counteracted, in that that region of the vehicle interior which lies in the range of the cooling or heating effect of a window, in particular a side window, is defined as an air-conditioning zone which is air-conditioned either via the lateral air outflow, or else additional-heating elements are also arranged in this window, in a similar way to a heatable rear window, and the air-conditioning zone can be heated or regulated as a result of these additional-heating elements being switched on.

Instead of simple additional-heating elements, for example, Peltier elements are also contemplated, so that cooling of the air-conditioning zone can also take place. The heatings may be, for example, window heatings, steering-wheel heatings or door-surface heatings. Surface or radiant heatings or additional blowers can be used for heating.

To regulate an air-conditioning zone, the additional-heating requirement, the cooling requirement, the blower capacity and the blow-out air temperature are set as a function of one another, for example, at an air outlet. Thus, at an air outlet, the additional-heating requirement, the blower capacity and the blowing-air desired temperature can be set as a function of one another. Consequently, the airstream can be throttled somewhat when the air is heated sharply, so that the hot air stream is not conducted so sharply to the driver and the regulated state is established as quickly as possible, taking into account the greatest possible comfort of the occupant. Thereby, the individual air outlets are activated such that a stratification of the interior temperature is achieved, so that the air is cooler in the head space than in the foot space. After the air-conditioning zone has been regulated, the method is concluded at step 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for regulating a heating and/or air-conditioning system having a control apparatus which activates individual air-conditioning components according to control and regulating programs contained therein, and a vehicle interior having individual air-conditioning zones regulateable individually in terms of air-conditioning capacity comprising independently detecting an air-conditioning deficit of each air-conditioning zone via a sensor in each air-conditioning zone, setting each of the detected air-conditioning zones independently, and using at least one additional central or decentralized additional-heating and/or cooling element to set each of the detected air-conditioning zones to an optimal eliminate in relation to each of the other detected air-conditioning zones.

2. The method according to claim 1, wherein the detecting of an air-conditioning deficit occurs in the event of deficient heating or cooling capacity or as a function of humidity.

3. The method according to claim 1, wherein at least one additional heating element comprises at least one of surface heaters, radiant heaters, and blowers.

4. The method according to claim 3, wherein the detecting of an air-conditioning deficit occurs in the event of deficient heating or cooling capacity or as a function of humidity.

5. The method according to claim 1, wherein the decentralized additional heating or cooling elements are arranged in a zone between a fan and air outlets to be activatable by the general air-conditioning regulation when an air-conditioning deficit therein is detected.

6. The method according to claim 5, wherein the detecting of an air-conditioning deficit occurs in the event of deficient heating or cooling capacity or as a function of humidity.

7. The method according to claim 5, wherein at least one additional heating element comprises at least one of surface heaters, radiant heaters, and blowers.

8. The method according to claim 7, wherein the detecting of an air-conditioning deficit occurs in the event of deficient heating or cooling capacity or as a function of humidity.

9. The method according to claim 1, wherein the additional heating or cooling requirement, the air quantity and the blow-out temperature are settable as a function of one another at an air outlet.

10. The method according to claim 9, wherein the detecting of an air-conditioning deficit occurs in the event of deficient heating or cooling capacity or as a function of humidity.

11. The method according to claim 10, wherein at least one additional heating element comprises at least one of surface heaters, radiant heaters, and blowers.

12. The method according to claim 9, wherein at least one additional heating element comprises at least one of surface heaters, radiant heaters, and blowers.

13. The method according to claim 12, wherein the detecting of an air-conditioning deficit occurs in the event of deficient heating or cooling capacity or as a function of humidity.

* * * * *